(12) United States Patent
Quach

(10) Patent No.: US 9,091,177 B2
(45) Date of Patent: Jul. 28, 2015

(54) SHARK-BITE TIP SHELF COOLING CONFIGURATION

(75) Inventor: San Quach, East Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 621 days.

(21) Appl. No.: 13/419,900

(22) Filed: Mar. 14, 2012

(65) Prior Publication Data

US 2013/0243596 A1 Sep. 19, 2013

(51) Int. Cl.
*F01D 5/18* (2006.01)
*F01D 5/20* (2006.01)

(52) U.S. Cl.
CPC *F01D 5/187* (2013.01); *F01D 5/20* (2013.01); *F05D 2250/11* (2013.01); *Y02T 50/676* (2013.01)

(58) Field of Classification Search
CPC ............... F01D 5/00; F01D 5/08; F01D 5/20; F01D 5/187
USPC ................. 416/90 R, 92, 95, 96 R, 97 R, 228
See application file for complete search history.

(56) References Cited

U.S. PATENT DOCUMENTS

| | | | |
|---|---|---|---|
| 5,476,364 A | 12/1995 | Kildea | |
| 5,688,107 A | 11/1997 | Downs et al. | |
| 5,997,251 A | 12/1999 | Lee | |
| 6,059,530 A | 5/2000 | Lee | |
| 6,135,715 A | 10/2000 | Correia | |
| 6,164,914 A | 12/2000 | Correia et al. | |
| 6,190,129 B1 | 2/2001 | Mayer et al. | |
| 6,382,913 B1 | 5/2002 | Lee et al. | |
| 6,491,498 B1 | 12/2002 | Seleski et al. | |
| 6,554,575 B2 | 4/2003 | Leeke et al. | |
| 6,790,005 B2 * | 9/2004 | Lee et al. | 416/97 R |
| 6,991,430 B2 | 1/2006 | Stec et al. | |
| 7,281,894 B2 | 10/2007 | Lee et al. | |
| 7,293,961 B2 | 11/2007 | Lee et al. | |
| 7,591,070 B2 * | 9/2009 | Lee | 29/889.1 |
| 7,607,893 B2 | 10/2009 | Lee et al. | |
| 7,922,451 B1 | 4/2011 | Liang | |
| 2003/0059309 A1 | 3/2003 | Szucs et al. | |
| 2004/0096328 A1 * | 5/2004 | Soechting et al. | 416/92 |
| 2007/0237637 A1 * | 10/2007 | Lee et al. | 416/97 R |

OTHER PUBLICATIONS

The International Search Report for International Application No. PCT/US2013/030706 mailed on Dec. 9, 2013.

* cited by examiner

*Primary Examiner* — Edward Look
*Assistant Examiner* — Danielle M Christensen
(74) *Attorney, Agent, or Firm* — Kinney & Lange, P.A.

(57) ABSTRACT

An airfoil includes a leading edge, a trailing edge, a suction surface, a pressure surface, and a tip shelf. The suction surface and the pressure surface both extend axially to connect the leading edge to the trailing edge. The suction surface and the pressure surface both extend radially from a root section of the airfoil a tip section of the airfoil. The tip shelf is formed along the tip section, and includes a triangular pocket.

16 Claims, 6 Drawing Sheets

SHARK-BITE TIP SHELF COOLING CONFIGURATION

BACKGROUND

This invention relates generally to turbomachinery, and specifically to turbine flow path components for gas turbine engines. In particular, the invention relates to cooling techniques for airfoils and other gas turbine engine components exposed to hot working fluid flow, including, but not limited to, rotor blades and stator vane airfoils, endwall surfaces including platforms, shrouds and compressor and turbine casings, combustor liners, turbine exhaust assemblies, thrust augmentors and exhaust nozzles.

Gas turbine engines are rotary-type combustion turbine engines built around a power core made up of a compressor, combustor and turbine, arranged in flow series with an upstream inlet and downstream exhaust. The compressor section compresses air from the inlet, which is mixed with fuel in the combustor and ignited to generate hot combustion gas. The turbine section extracts energy from the expanding combustion gas, and drives the compressor section via a common shaft. Expanded combustion products are exhausted downstream, and energy is delivered in the form of rotational energy in the shaft, reactive thrust from the exhaust, or both.

Gas turbine engines provide efficient, reliable power for a wide range of applications in aviation, transportation and industrial power generation. Small-scale gas turbine engines typically utilize a one-spool design, with co-rotating compressor and turbine sections. Larger-scale combustion turbines including jet engines and industrial gas turbines (IGTs) are generally arranged into a number of coaxially nested spools. The spools operate at different pressures, temperatures and spool speeds, and may rotate in different directions.

Individual compressor and turbine sections in each spool may also be subdivided into a number of stages, formed of alternating rows of rotor blade and stator vane airfoils. The airfoils are shaped to turn, accelerate and compress the working fluid flow, or to generate lift for conversion to rotational energy in the turbine.

Industrial gas turbines often utilize complex nested spool configurations, and deliver power via an output shaft coupled to an electrical generator or other load, typically using an external gearbox. In combined cycle gas turbines (CCGTs), a steam turbine or other secondary system is used to extract additional energy from the exhaust, improving thermodynamic efficiency. Gas turbine engines are also used in marine and land-based applications, including naval vessels, trains and armored vehicles, and in smaller-scale applications such as auxiliary power units.

Aviation applications include turbojet, turbofan, turboprop and turboshaft engine designs. In turbojet engines, thrust is generated primarily from the exhaust. Modern fixed-wing aircraft generally employ turbofan and turboprop configurations, in which the low pressure spool is coupled to a propulsion fan or propeller. Turboshaft engines are employed on rotary-wing aircraft, including helicopters, typically using a reduction gearbox to control blade speed. Unducted (open rotor) turbofans and ducted propeller engines also known, in a variety of single-rotor and contra-rotating designs with both forward and aft mounting configurations.

Aviation turbines generally utilize two and three-spool configurations, with a corresponding number of coaxially rotating turbine and compressor sections. In two-spool designs, the high pressure turbine drives a high pressure compressor, forming the high pressure spool or high spool. The low-pressure turbine drives the low spool and fan section, or a shaft for a rotor or propeller. In three-spool engines, there is also an intermediate pressure spool. Aviation turbines are also used to power auxiliary devices including electrical generators, hydraulic pumps and elements of the environmental control system, for example using bleed air from the compressor or via an accessory gearbox.

Turbofan engines are commonly divided into high and low bypass configurations. High bypass turbofans generate thrust primarily from the fan, which accelerates airflow through a bypass duct oriented around the engine core. This design is common on commercial aircraft and transports, where noise and fuel efficiency are primary concerns. The fan rotor may also operate as a first stage compressor, or as a pre-compressor stage for the low-pressure compressor or booster module. Variable-area nozzle surfaces can also be deployed to regulate the bypass pressure and improve fan performance, for example during takeoff and landing. Advanced turbofan engines may also utilize a geared fan drive mechanism to provide greater speed control, reducing noise and increasing engine efficiency, or to increase or decrease specific thrust.

Low bypass turbofans produce proportionally more thrust from the exhaust flow, generating greater specific thrust for use in high-performance applications including supersonic jet aircraft. Low bypass turbofan engines may also include variable-area exhaust nozzles and afterburner or augmentor assemblies for flow regulation and short-term thrust enhancement. Specialized high-speed applications include continuously afterburning engines and hybrid turbojet/ramjet configurations.

Across these applications, turbine performance depends on the balance between higher pressure ratios and core gas path temperatures, which tend to increase efficiency, and the related effects on service life and reliability due to increased stress and wear. This balance is particularly relevant to gas turbine engine components in the hot sections of the compressor, combustor, turbine and exhaust sections, where active cooling is required to prevent damage due to high gas path temperatures and pressures.

SUMMARY

An airfoil includes a leading edge, a trailing edge, a suction surface, a pressure surface, and a tip shelf. The suction surface and the pressure surface both extend axially to connect the leading edge to the trailing edge. The suction surface and the pressure surface both extend radially from a root section of the airfoil to a tip section of the airfoil. The tip shelf is formed along the tip section, and includes a triangular cooling pocket.

A rotor blade for a gas turbine engine includes an airfoil and a tip shelf. The airfoil includes a convex surface and a concave surface. Both the convex surface and the concave surface extend radially from a root section to a tip section and axially from a leading edge to a trailing edge. A mean camber line is defined midway between the convex surface and the concave surface. The tip shelf extends axially along the tip section between the mean camber line and the concave surface. The tip shelf includes at least one wall positioned perpendicular to fluid flow streamlines.

An airfoil for a gas turbine engine includes a leading edge, a trailing edge, a pressure surface, a suction surface, and a tip shelf. The leading edge and the trailing edge both extend from a root section to a tip section. The pressure surface and the suction surface both extend between the leading edge and the trailing edge. The pressure surface and the suction surface define a mean camber line therebetween. The tip shelf is located at the tip section, and includes a plurality of triangular recesses. Each triangular recess has three sides, wherein two of the sides are defined by perimeter walls.

DETAILED DESCRIPTION

Figure 1:
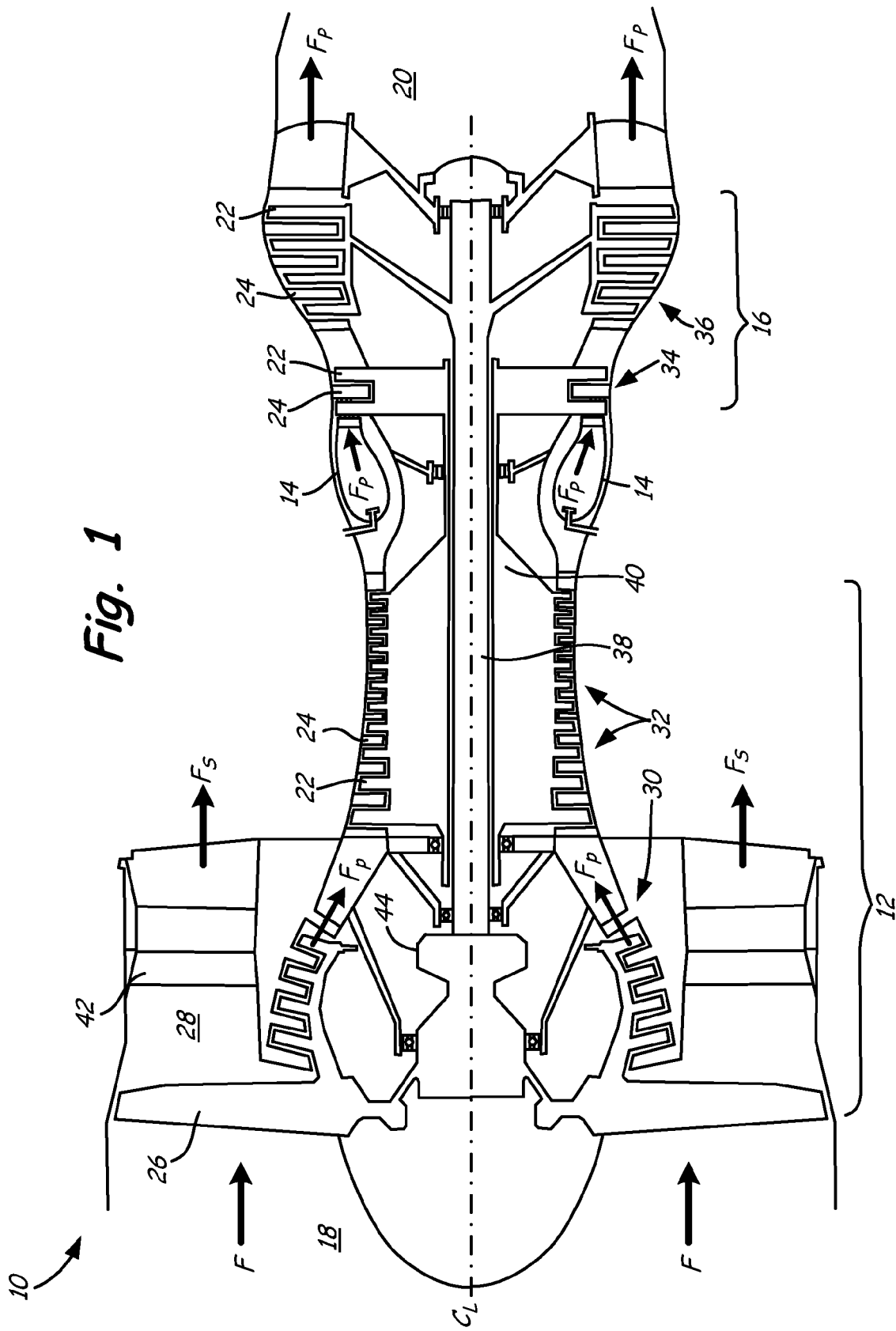
FIG. 1 is a cross-sectional view of a gas turbine engine.

FIG. 1 is a cross-sectional view of gas turbine engine 10. Gas turbine engine (or turbine engine) 10 includes a power core with compressor section 12, combustor 14 and turbine section 16 arranged in flow series between upstream inlet 18 and downstream exhaust 20. Compressor section 12 and turbine section 16 are arranged into a number of alternating stages of rotor airfoils (or blades) 22 and stator airfoils (or vanes) 24.

In the turbofan configuration of FIG. 1, propulsion fan 26 is positioned in bypass duct 28, which is coaxially oriented about the engine core along centerline (or turbine axis) $C_L$. An open-rotor propulsion stage 26 may also provided, with turbine engine 10 operating as a turboprop or unducted turbofan engine. Alternatively, fan rotor 26 and bypass duct 28 may be absent, with turbine engine 10 configured as a turbojet or turboshaft engine, or an industrial gas turbine.

For improved service life and reliability, components of gas turbine engine 10 are provided with an improved cooling configuration, as described below. Suitable components for the cooling configuration include rotor airfoils 22, stator airfoils 24 and other gas turbine engine components exposed to hot gas flow, including, but not limited to, platforms, shrouds, casings and other endwall surfaces in hot sections of compressor 12 and turbine 16, and liners, nozzles, afterburners, augmentors and other gas wall components in combustor 14 and exhaust section 20.

In the two-spool, high bypass configuration of FIG. 1, compressor section 12 includes low pressure compressor (LPC) 30 and high pressure compressor (HPC) 32, and turbine section 16 includes high pressure turbine (HPT) 34 and low pressure turbine (LPT) 36. Low pressure compressor 30 is rotationally coupled to low pressure turbine 36 via low pressure (LP) shaft 38, forming the LP spool or low spool. High pressure compressor 32 is rotationally coupled to high pressure turbine 34 via high pressure (HP) shaft 40, forming the HP spool or high spool.

Flow F at inlet 18 divides into primary (core) flow $F_P$ and secondary (bypass) flow $F_S$ downstream of fan rotor 26. Fan rotor 26 accelerates secondary flow $F_S$ through bypass duct 28, with fan exit guide vanes (FEGVs) 42 to reduce swirl and improve thrust performance. In some designs, structural guide vanes (SGVs) 42 are used, providing combined flow turning and load bearing capabilities.

Primary flow $F_P$ is compressed in low pressure compressor 30 and high pressure compressor 32, then mixed with fuel in combustor 14 and ignited to generate hot combustion gas. The combustion gas expands to provide rotational energy in high pressure turbine 34 and low pressure turbine 36, driving high pressure compressor 32 and low pressure compressor 30, respectively. Expanded combustion gases exit through exhaust section (or exhaust nozzle) 20, which can be shaped or actuated to regulate the exhaust flow and improve thrust performance.

Low pressure shaft 38 and high pressure shaft 40 are mounted coaxially about centerline $C_L$, and rotate at different speeds. Fan rotor (or other propulsion stage) 26 is rotationally coupled to low pressure shaft 38. In advanced designs, fan drive gear system 44 is provided for additional fan speed control, improving thrust performance and efficiency with reduced noise output.

Fan rotor 26 may also function as a first-stage compressor for gas turbine engine 10, and LPC 30 may be configured as an intermediate compressor or booster. Alternatively, propulsion stage 26 has an open rotor design, or is absent, as described above. Gas turbine engine 10 thus encompasses a wide range of different shaft, spool and turbine engine configurations, including one, two and three-spool turboprop and (high or low bypass) turbofan engines, turboshaft engines, turbojet engines, and multi-spool industrial gas turbines.

In each of these applications, turbine efficiency and performance depend on the overall pressure ratio, defined by the total pressure at inlet 18 as compared to the exit pressure of compressor section 12, for example at the outlet of high pressure compressor 32, entering combustor 14. Higher pressure ratios, however, also result in greater gas path temperatures, increasing the cooling loads on rotor airfoils 22, stator airfoils 24 and other components of gas turbine engine 10. To reduce operating temperatures, increase service life and maintain engine efficiency, these components are provided with improved cooling configurations, as described below. Suitable components include, but not limited to, cooled gas turbine engine components in compressor sections 30 and 32, combustor 14, turbine sections 34 and 36, and exhaust section 20 of gas turbine engine 10.

Figure 2A:
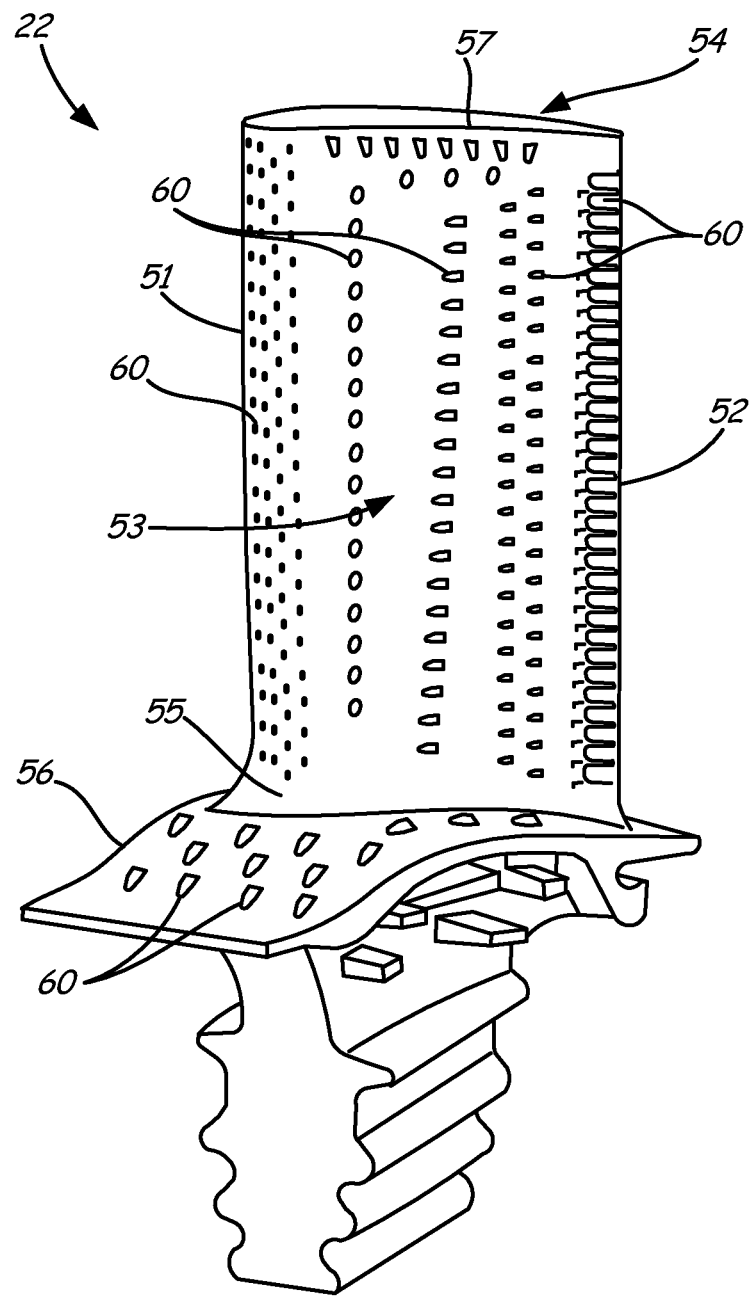
FIG. 2A is a perspective view of an airfoil for the gas turbine engine, in a rotor blade configuration.

FIG. 2A is a perspective view of rotor airfoil (or blade) 22 for gas turbine engine 10, as shown in FIG. 1, or for another turbomachine. Rotor airfoil 22 extends axially from leading edge 51 to trailing edge 52, defining pressure surface 53 (front) and suction surface 54 (back) therebetween.

Pressure and suction surfaces 53 and 54 form the major opposing surfaces or walls of airfoil 22, extending axially between leading edge 51 and trailing edge 52, and radially from root section 55, adjacent inner diameter (ID) platform 56, to tip section 57, opposite ID platform 56. In some designs, tip section 57 is shrouded.

Cooling holes or outlets 60 are provided on one or more surfaces of airfoil 22, for example along leading edge 51, trailing edge 52, pressure (or concave) surface 53, or suction (or convex) surface 54, or a combination thereof. Cooling holes or passages 60 may also be provided on the endwall surfaces of airfoil 22, for example along ID platform 56, or on a shroud or engine casing adjacent tip section 57.

Figure 2B:
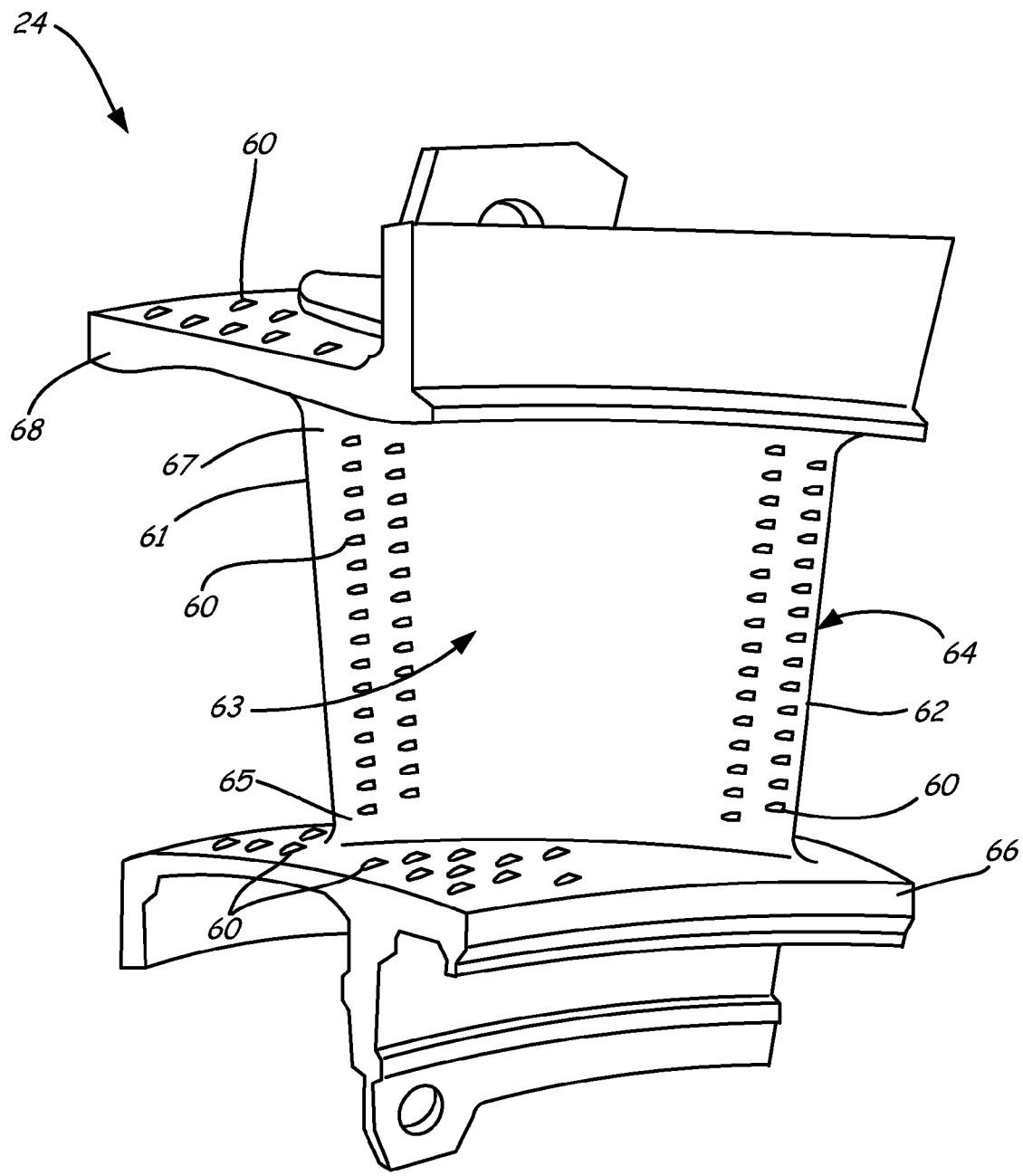
FIG. 2B is a perspective view of an airfoil for the gas turbine engine, in a stator vane configuration.

FIG. 2B is a perspective view of stator airfoil (or vane) 24 for gas turbine engine 10, as shown in FIG. 1, or for another turbomachine. Stator airfoil 24 extends axially from leading edge 61 to trailing edge 62, defining pressure surface 63 (front) and suction surface 64 (back) therebetween. Pressure and suction surfaces 63 and 64 extend from inner (or root) section 65, adjacent ID platform 66, to outer (or tip) section 67, adjacent outer diameter (OD) platform 68.

Cooling holes or outlets 60 are provided along one or more surfaces of airfoil 24, for example leading or trailing edge 61 or 62, pressure (concave) or suction (convex) surface 63 or 64, or a combination thereof. Cooling holes or passages 60 may also be provided on the endwall surfaces of airfoil 24, for example along ID platform 66 and OD platform 68.

Rotor airfoils 22 (FIG. 2A) and stator airfoils 24 (FIG. 2B) are formed of high strength, heat resistant materials such as high temperature alloys and superalloys, and are provided with thermal and erosion-resistant coatings. Airfoils 22 and 24 are also provided with internal cooling passages and cooling holes 60 to reduce thermal fatigue and wear, and to prevent melting when exposed to hot gas flow in the higher temperature regions of a gas turbine engine or other turbomachine. Cooling holes 60 deliver cooling fluid (e.g., steam or air from a compressor) through the outer walls and platform structures of airfoils 22 and 24, creating a thin layer (or film) of cooling fluid to protect the outer (gas path) surfaces from high temperature flow.

While surface cooling extends service life and increases reliability, injecting cooling fluid into the gas path also reduces engine efficiency, and the cost in efficiency increases with the required cooling flow. Cooling holes 60 are thus provided with improved metering and inlet geometry to reduce jets and blow off, and improved diffusion and exit geometry to reduce flow separation. Cooling holes 60 reduce flow requirements and improve the spread of cooling fluid across the hot outer surfaces of airfoils 22 and 24, and other gas turbine engine components, so that less flow is needed for cooling and efficiency is maintained or increased.

Figure 3A:
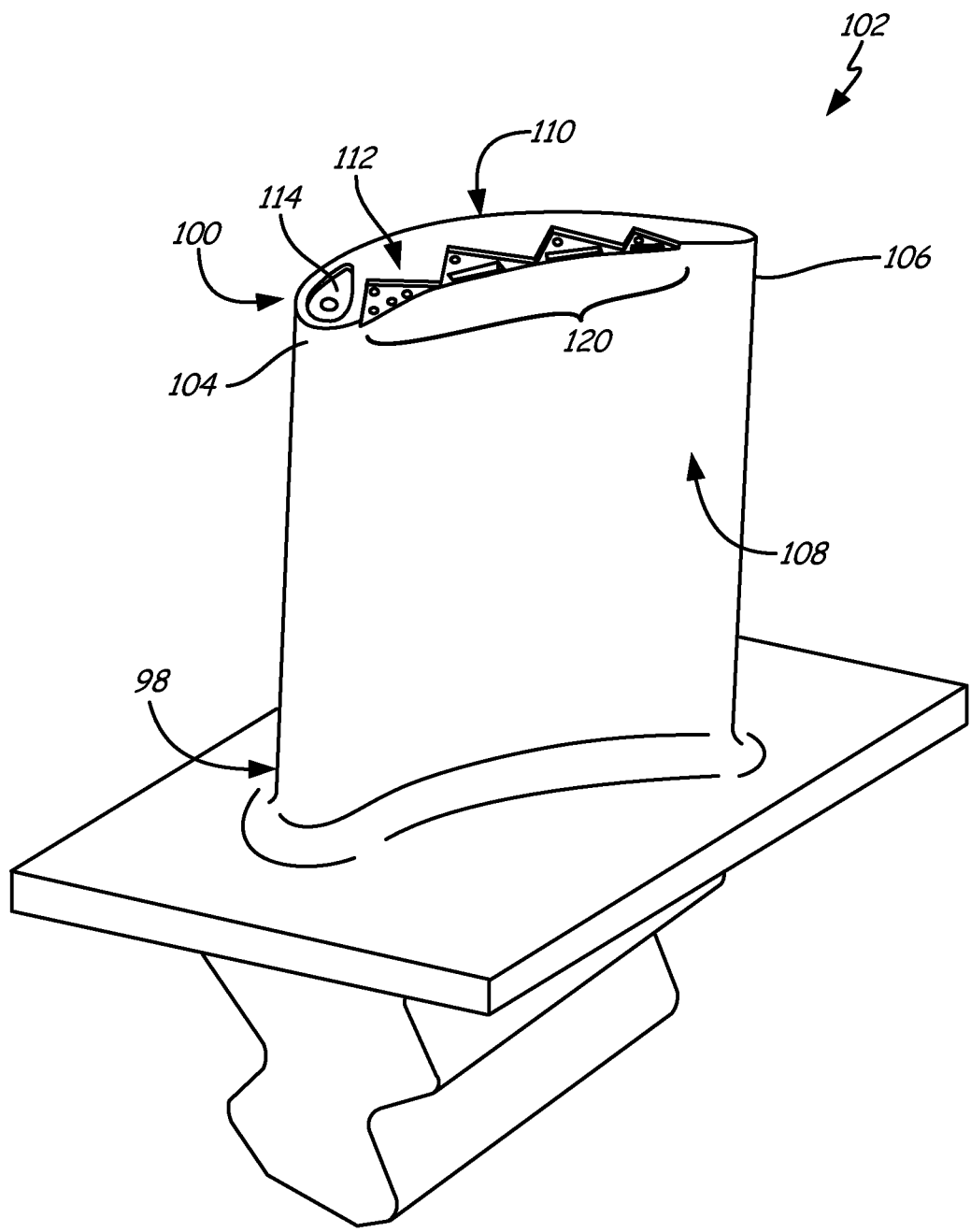
FIG. 3A is a perspective view of an airfoil in a rotor blade configuration.
Figure 3B:
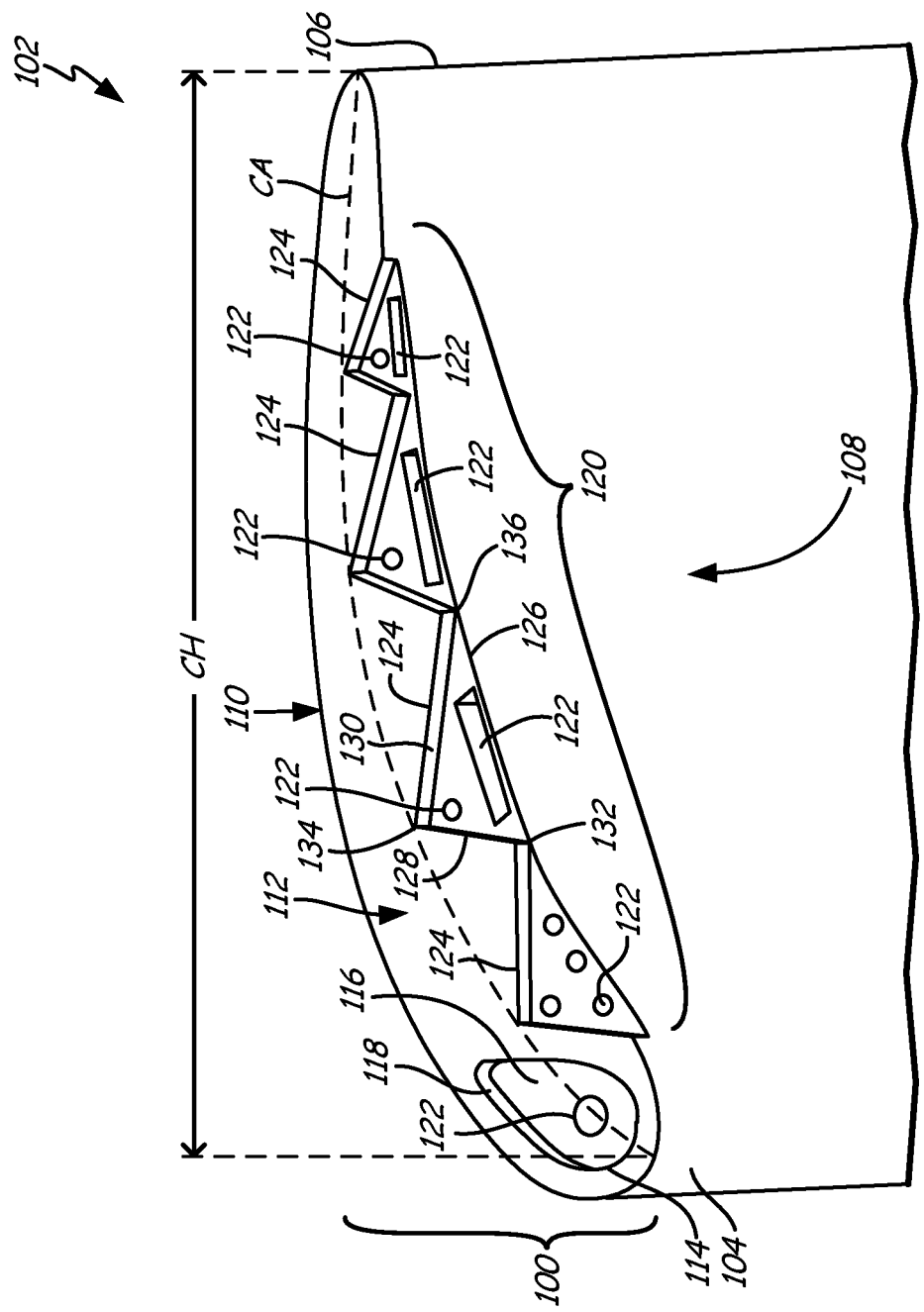
FIG. 3B is an enlarged perspective view of a tip section for the rotor blade of FIG. 3A.

FIG. 3A is a perspective view of airfoil 102 in a rotor blade configuration, and FIG. 3B is an enlarged perspective view of tip section 100 for airfoil 102. Airfoil 102 includes root section 98, tip section 100, leading edge 104, trailing edge 106, pressure or concave surface 108, suction or convex surface 110, tip surface 112, squealer pocket 114 having floor 116 and wall 118, tip shelf 120, and cooling outlets 122. Tip shelf 120 includes shelf pockets 124, each shelf pocket 124 having three sides (first side 126, second side 128, third side 130) and three points (first point 132, second point 134, and third point 136). Also shown in FIG. 3B are chord line CH and camber line CA. Shelf pockets 124 forming tip shelf 120 are triangular in shape to reduce fluid flow leakage past tip section 100, improve temperature distribution within tip section 100, and facilitate filling of cooling air for tip section 100.

Airfoil 102 is similar to rotor blade airfoil 22 described above with reference to FIG. 2A. As shown in FIG. 3A, airfoil 102 extends axially from leading edge 104 to trailing edge 106, with trailing edge 106 located downstream of leading edge 104. Pressure or concave surface 108 forms front of airfoil 102, and suction or convex surface 110 forms back of airfoil 102, such that pressure surface 108 and suction surface 110 define a profile of airfoil 102. Pressure surface 108 and suction surface 110 form the major opposing surfaces or walls of airfoil 102. Pressure surface 108 and suction surface 110 extend axially between leading edge 104 and trailing edge 106. Pressure surface 108 and suction surface 110 extend radially from root section 98 to tip section 100, thereby defining a span height of airfoil 102.

Tip section 100 extends axially from leading edge 104 to trailing edge 106, and transversely or circumferentially from pressure surface 108 to suction surface 110. Tip section 100 includes a substantially planar tip surface 112 having two major recesses, pockets, or cut-outs: squealer pocket 114 and tip shelf 120. As shown in FIG. 3B, at least one cooling outlet 122 is present in each of squealer pocket 114 and tip shelf 120, although more and less cooling outlets are equally contemplated.

Squealer pocket 114 is relatively small, located near leading edge 104, and is at least partially upstream of tip shelf 120. In the depicted embodiment, squealer pocket 114 extends for about 10% of chord line CH (a straight line connecting leading edge 104 to trailing edge 106), although squealer pocket 114 could be designed as a larger or smaller recess. As shown, squealer pocket 114 extends across camber line CA (a curved line midway between pressure surface 108 and suction surface 110), although other configurations are contemplated. Squealer pocket 114 has floor 116, which is recessed in comparison to, and substantially parallel with, tip surface 112. Extending radially upwards from floor 116 is substantially perpendicular wall 118. Wall 118 forms a continuous perimeter for squealer pocket 114, which is closed on all sides (i.e. fully enclosed axially, radially, and transversely). In the depicted embodiment, squealer pocket 114 is tear drop shaped with an enlarged portion positioned near leading edge 104, although other suitable shapes are within the scope of this disclosure. Likewise, one cooling outlet 122 (e.g. cooling hole) is located centrally within squealer pocket 114, but more, less, or different cooling outlet features are possible.

Tip shelf 120 is relatively large and extends axially from a location near leading edge 104 (but downstream of a least a portion squealer pocket 114), along the intersection of tip section 100 and pressure surface 108, to a location near trailing edge 106. In the depicted embodiment, tip shelf 120 extends for about 75% of chord line CH, although tip shelf 120 could be designed as a larger or smaller axial recess. As shown, tip shelf 120 is located wholly on pressure side 108 of camber line CA, although other configurations are contemplated (i.e. a larger tip shelf could beyond camber line CA toward suction surface 110). Tip shelf 120 is formed from a plurality of triangular shaped shelf pockets 124. In the depicted embodiment, each shelf pocket includes at least two cooling outlets 122, but more, less, or different cooling outlet features are possible. Cooling outlets 122 as used herein includes cooling outlet features of any shape (e.g. circular, rectangular slot, etc.). Cooling outlets 122 are also located on other surfaces of airfoil 102, as shown and described with reference to cooling outlets 60 on rotor blade 22 in FIG. 2A.

In the depicted embodiment, tip shelf 120 is formed from four triangular shaped shelf pockets 124, although more or less shelf pockets 124 are possible. The triangular design of tip shelf 120 resembles a shark-bite or a zig-zag. Each shelf pocket 124 is defined by three sides (first side 126, second side 128, third side 130), which are joined to one another at three points (first point 132, second point 134, and third point 136). One or more of the triangular shaped shelf pockets 124 can be a right-angle triangle. In the embodiment depicted, a single shelf pocket 124 extends for about 20% of the chord line CH, but smaller and larger shelf pockets 124 are within the scope of this disclosure.

The following description refers to one of the shelf pockets 124, but is equally applicable to each of the shelf pockets 124. First side 126 extends axially along the junction of tip section 100 and pressure surface 108, such that first side 126 is open to and continuous with pressure surface 108. Second side 128 is attached to first side 126 at first point 132, which is located at the junction of tip section 100 and pressure surface 108. Second side 128 extends transversely across tip surface 122 from first point 132 at an acute angle to first side 126. Second side 128 extends angularly toward suction surface 110 to second point 134, but does not extend beyond camber line CA. In other embodiments, second side 128 does extend beyond camber line CA closer to suction side 110. Third side 130 is attached to second side 128 at second point 134, which is located at or near camber line CA. Third side 130 extends transversely across tip surface 122 from second point 134 at an approximately right angle to second side 128. Third side 130 extends angularly toward pressure surface 112 to third point 136 located at a junction of tip section and pressure surface 108. Third side 130 is attached to first side at third point 136 to complete a perimeter of shelf pocket 124. While the points or corners and sides or walls are described as angular (e.g. acute or right), it should be appreciated that, as a result of manufacturing, these junctions may not be perfectly sharp and may be slightly rounded.

In between the perimeter formed by first side 126, second side 128, and third side 130 is a floor of tip pocket 124, which is recessed from, and substantially parallel to, tip surface 112. While first side 126 is open, second side 128 and third side 130 are closed. More specifically, a wall extends axially upward and substantially perpendicularly from the floor along both second side 128 and third side 130. Second side 128 and third side 130 include these vertical walls to collectively form a pocket around cooling holes(s) 122 and/or cooling slots 124 for pooling cooling air at tip shelf 120.

When airfoil 102 is exposed to high temperature fluid flow, for example in the turbine and high pressure compressor sections of gas turbine engine, tip section 100 experiences oxidation, erosion, burn-through, thermal mechanical fatigue, and other high temperature effects. To address this problem, tip section 100 of airfoil 102 is formed with squealer pocket 118 and tip shelf 120, which aid in cooling of tip section 100 by pooling or collecting cooling fluid. Cooling fluid (e.g. air) is introduced into squealer pocket 118 and tip shelf 120 by cooling outlets 122. Squealer pocket 118 then maintains a region or pocket of cooling fluid along tip section 100 of airfoil 102, between pressure surface 108 and suction surface 110. Similarly, tip shelf 120 maintains a region or pocket of cooling fluid along pressure surface 120, between leading edge 104 and trailing edge 106 of tip section 100. These pockets of pooled cooling fluid provide a more uniform cooling temperature along tip section 100. Since the overall area of tip shelf 120 is broken up into discrete shelf pockets 124 each having a reduced volume, shelf pockets 124 will fill more quickly and fully with cooling fluid, as well as require less cooling fluid.

The triangular design of tip shelf 120 also decreases the heat transfer coefficient across tip section 100, improving the performance and service life of airfoil 21. The triangular structure of tip shelf 120 reduces mass flow across the tip, so the heat transfer coefficient is also reduced in tip section 100. That means there is less heat transfer from the working fluid into airfoil tip section 100, resulting in decreased thermal effects and improved service life for airfoil 102. Additional benefits of the present disclosure are discussed below with reference to FIG. 4.

Figure 4:
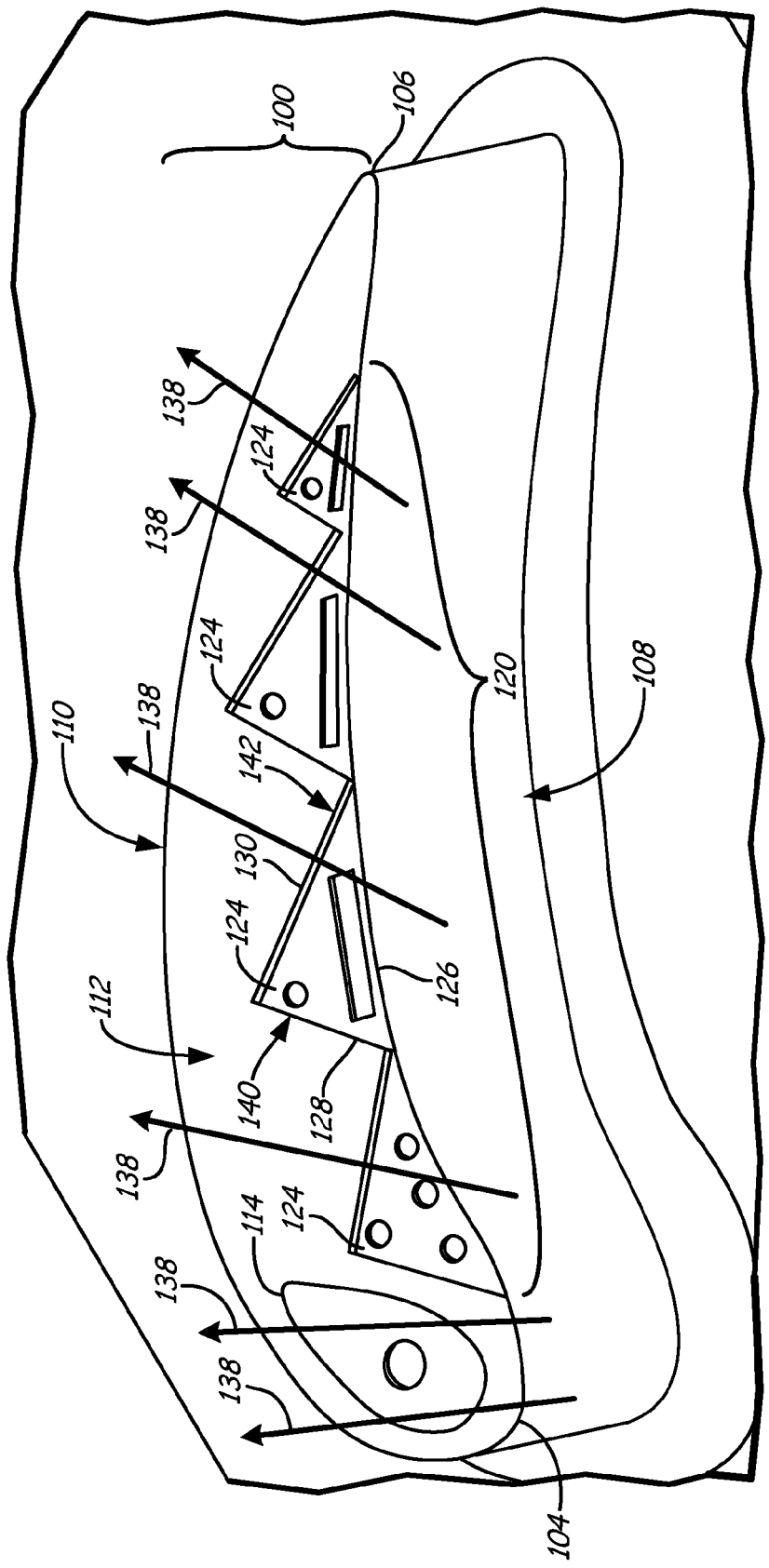
FIG. 4 is a perspective view of the tip section from FIG. 3 with fluid flow streamlines shown.

FIG. 4 is a perspective view of tip section 100 from FIGS. 3A-3B with fluid flow streamlines 138 shown. Airfoil 102 includes tip section 100, leading edge 104, trailing edge 106, pressure surface 108, suction surface 110, tip surface 112, squealer pocket 114, and tip shelf 120. Tip shelf 120 includes shelf pockets 124, each shelf pocket 124 having three sides (first side 126, second side 128, third side 130). Second side 128 includes second rib or wall 140 and third side 130 includes third rib or wall 142. Third wall 142 is oriented substantially perpendicular to fluid flow streamlines 138 in order to reduce fluid flow past tip section 100.

As described above with reference to FIGS. 3A-3B, tip section 100 extends axially from leading edge 104 to trailing edge 106, and transversely or circumferentially from pressure surface 108 to suction surface 110. Tip section 100 includes a substantially planar tip surface 112 having two major cavities, recesses, pockets, or cut-outs: squealer pocket 114 and tip shelf 120. Squealer pocket 114 extends between pressure surface 108 and suction surface 110 near leading edge 104.

Tip shelf 120 extends adjacent pressure surface 108, from a location near leading edge 104 to a location near trailing edge 106.

Tip shelf 120 defines an open (or discontinuous) perimeter radial recess in tip section 120. That is, the tip shelf 120 is open along pressure surface 108. Tip shelf 120 is formed from a plurality of tip pockets 124, each of which individually forms an open perimeter radial recess. Each shelf pocket 124 is triangular and includes a first side 126 open along and continuous with pressure surface 108. Second side 128 is closed by second wall 140 extending radially or vertically upwards from a floor of tip pocket 124. Similarly, third side 130 is closed by third wall 142 extending radially or vertically upwards from a floor of tip pocket 124. Second wall 140 and third wall 142 close second side 128 and third side 30 to retain a pocket of cooling air in tip pocket 124 as described above with reference to FIG. 3. Further, third wall 142 is oriented substantially perpendicular to fluid flow streamlines 138 in order to block fluid flow across tip section. More specifically, third wall 142 for each tip pocket 124 is oriented perpendicular to fluid flow streamlines 138, which requires each third wall 142 to have a slightly different angle along tip shelf 120 thereby maximizing fluid flow resistance.

During use, working fluid (hot air or gas) flows along pressure side 108 of airfoil 102. Some of the working fluid leaks or migrates across tip section 100, as shown by fluid flow streamlines 138. This leakage across tip section 100 is undesirable as it is unused "work" that reduces engine efficiency. Tip shelf 120 is formed from triangular tip pockets 124 that reduce fluid leakage or maximize flow resistance across tip section 100. More specifically, third wall 142 of each tip pocket 124 is oriented substantially perpendicular to fluid flow streamlines 138 in order to directly block fluid from flowing across tip section 100. Since third wall 142 extends to the junction of tip shelf 120 and suction surface 108, fluid flow is also blocked from entering a downstream tip pocket 124. The angular nature of tip shelf 120 provides a more effective blockade to fluid flow than a conventional tip shelf.

The gas turbine engine components, gas path walls and cooling features (cooling holes, cooling slots, squealer pocket, tip shelf, etc.) described herein can thus be manufactured using one or more of a variety of different processes. These techniques provide each cooling feature with its own particular configuration, including, but not limited to, inlet, metering, transition, diffusion, outlet, upstream wall, downstream wall, lateral wall, longitudinal, lobe and downstream edge features. In some cases, multiple techniques can be combined to improve overall cooling performance or reproducibility, or to reduce manufacturing costs.

Suitable manufacturing techniques for forming the cooling configurations described here include, but are not limited to, electrical discharge machining (EDM), laser drilling, laser machining, electrical chemical machining (ECM), water jet machining, casting, conventional machining and combinations thereof. Electrical discharge machining includes both machining using a shaped electrode as well as multiple pass methods using a hollow spindle or similar electrode component. Laser machining methods include, but are not limited to, material removal by ablation, trepanning and percussion laser machining. Conventional machining methods include, but are not limited to, milling, drilling and grinding.

The gas flow path walls and outer surfaces of some gas turbine engine components include one or more coatings, such as bond coats, thermal barrier coatings, abrasive coatings, abradable coatings and erosion or erosion-resistant coatings. For components having a coating, the inlet, metering portion, transition, diffusion portion and outlet cooling features may be formed prior to coating application, after a first coating (e.g., a bond coat) is applied, or after a second or third (e.g., interlayer) coating process, or a final coating (e.g., environmental or thermal barrier) coating process. Depending on component type, cooling feature location, repair requirements and other considerations, the diffusion portion and outlet features may be located within a wall or substrate, within a thermal barrier coating or other coating layer applied to a wall or substrate, or based on combinations thereof. The cooling geometry and other features may remain as described above, regardless of position relative to the wall and coating materials or airfoil materials.

In addition, the order in which cooling features are formed and coatings are applied may affect selection of manufacturing techniques, including techniques used in forming the inlet, metering portion, transition, outlet, diffusion portion and other cooling features. For example, when a thermal barrier coat or other coating is applied to the outer surface of a gas path wall before the cooling hole or passage is produced, laser ablation or laser drilling may be used. Alternatively, either laser drilling or water jet machining may be used on a surface without a thermal barrier coat. Additionally, different machining methods may be more or less suitable for forming different features of the cooling hole or cooling passage, for example, different EDM, laser machining and other machining techniques may be used for forming the outlet and diffusion features, and for forming the transition, metering and inlet features.

Discussion of Possible Embodiments

The following are non-exclusive descriptions of possible embodiments of the present invention.

An airfoil includes a leading edge, a trailing edge, a suction surface, a pressure surface, and a tip shelf. The suction surface and the pressure surface both extend axially to connect the leading edge to the trailing edge. The suction surface and the pressure surface both extend radially from a root section of the airfoil to a tip section of the airfoil. The tip shelf is formed along the tip section, and includes a triangular cooling pocket.

The airfoil of the preceding paragraph can optionally include, additionally and/or alternatively any, one or more of the following features, configurations and/or additional components:

the triangular pocket can include a first side that is open to and continuous with the pressure surface;

the triangular pocket can include a second side attached to the first side at a first point located near the pressure surface, the second side having a second side wall extending from the first point across the tip section toward the suction surface at an acute angle;

the triangular pocket can include a third side attached to the second side at a second point located between the pressure surface and the suction surface, the third side having a third side wall extending from the second point across the tip section toward the pressure surface;

the third side can be attached to the first side at a third point located near the pressure surface, the third side wall extending from the third point across the tip section to the second point at an acute angle;

a cooling hole can be located inside of the triangular pocket; and/or a cooling slot can be located inside of the triangular pocket.

A rotor blade for a gas turbine engine includes an airfoil and a tip shelf. The airfoil includes a convex surface and a concave surface. Both the convex surface and the concave surface extend radially from a root section to a tip section and axially from a leading edge to a trailing edge. A mean camber line is defined midway between the convex surface and the concave surface. The tip shelf extends axially along the tip section between the mean camber line and the concave surface. The tip shelf includes at least one wall positioned perpendicular to fluid flow streamlines.

The rotor blade of the preceding paragraph can optionally include, additionally and/or alternatively any, one or more of the following features, configurations and/or additional components:

The tip shelf can include a plurality of shelf sections and each self section includes a wall positioned perpendicular to fluid flow streamlines;

the walls can be positioned perpendicular to fluid flow streamlines are connected by a plurality of opposing walls to form a zig-zag perimeter for the tip shelf;

the tip shelf can be radially open to the concave surface;

a squealer pocket can be located on the tip section;

at least a portion of the squealer pocket can be located axially upstream from the tip shelf; and/or a plurality of cooling outlets can be formed in the tip shelf to maintain a pocket of cooling fluid along the tip section.

An airfoil for a gas turbine engine includes a leading edge, a trailing edge, a pressure surface, a suction surface, and a tip shelf. The leading edge and the trailing edge both extend from a root section to a tip section. The pressure surface and the suction surface both extend between the leading edge and the trailing edge. The pressure surface and the suction surface define a mean camber line therebetween. The tip shelf is located at the tip section, and includes a plurality of triangular recesses. Each triangular recess has three sides, wherein two of the sides are defined by perimeter walls.

The airfoil of the preceding paragraph can optionally include, additionally and/or alternatively any, one or more of the following features, configurations and/or additional components:

one side of each triangular recess can be open to the pressure surface;

the tip shelf can extend along more than 50% of a chord line of the airfoil;

the triangular recesses can be located between the mean camber line and the pressure surface;

at least one cooling hole or cooling slot can be located in each triangular recess; and/or at least one perimeter wall of each triangular recess can be oriented perpendicular to streamlines of fluid flow.

The invention claimed is:

1. An airfoil comprising:

a leading edge and a trailing edge;

a suction surface and a pressure surface, the suction surface and the pressure surface both extending axially to connect the leading edge to the trailing edge, the suction surface and the pressure surface both extending radially from a root section of the airfoil to a tip section of the airfoil, wherein the tip section has a tip surface, and wherein a mean camber line is defined midway between the suction surface and the pressure surface;

a tip shelf formed along the tip section, the tip shelf comprising:

a first tip pocket floor recessed from the tip surface;

a first wall extending from a first location proximate the pressure surface towards the mean camber line;

a second wall extending from a second location proximate the pressure surface towards the mean camber line, wherein the first and second walls intersect, and wherein the first tip pocket floor, the first wall and the second wall define a first triangular cooling pocket; a second tip pocket floor recessed from the tip surface;

a third wall extending from the second location proximate the pressure surface towards the mean camber line; and a fourth wall extending from a third location proximate the pressure surface towards the mean camber line, wherein the third and fourth walls intersect, and wherein the second tip pocket floor, the third wall and fourth wall define a second triangular cooling pocket.

2. The airfoil of claim 1, wherein the first triangular pocket includes a first side that is open to and continuous with the pressure surface.

3. The airfoil of claim 1, wherein the first wall extends from the first location proximate the pressure surface across the tip section toward the suction surface at an acute angle.

4. The airfoil of claim 1, wherein the second wall extends from the second location proximate the pressure surface across the tip section toward the suction surface at an acute angle.

5. The airfoil of claim 1, wherein a cooling hole is located inside of the first triangular pocket.

6. The airfoil of claim 1, wherein a cooling slot is located inside of the first triangular pocket.

7. A rotor blade for a gas turbine engine, the rotor blade comprising:
  an airfoil including a convex surface and a concave surface, both the convex surface and the concave surface extending radially from a root section to a tip section and axially from a leading edge to a trailing edge, wherein a mean camber line is defined midway between the convex surface and the concave surface;
  a tip shelf extending axially along the tip section between the mean camber line and the concave surface, wherein the tip shelf includes a plurality of shelf sections and each shelf section includes a wall positioned perpendicular to fluid flow streamlines, and wherein the walls positioned perpendicular to fluid flow streamlines are connected by a plurality of opposing walls to form a zig-zag perimeter for the tip shelf.

8. The rotor blade of claim 7, wherein the tip shelf is radially open to the concave surface.

9. The rotor blade of claim 7, furthering comprising:
  a squealer pocket located on the tip section.

10. The rotor blade of claim 9, wherein at least a portion of the squealer pocket is located axially upstream from the tip shelf.

11. The rotor blade of claim 7, further comprising:
  a plurality of cooling outlets formed in the tip shelf to maintain a pocket of cooling fluid along the tip section.

12. An airfoil for a gas turbine engine, the airfoil comprising:
  a leading edge and a trailing edge, the leading edge and the trailing edge both extending from a root section to a tip section;
  a pressure surface and a suction surface, the pressure surface and the suction surface both extending between the leading edge and the trailing edge, the pressure surface and the suction surface defining a mean camber line therebetween; and
  a tip shelf located at the tip section, the tip shelf including a plurality of triangular recesses, each triangular recess having three sides and a substantially planar floor, wherein two of the sides are defined by perimeter walls, wherein at least one perimeter wall of each triangular recess is oriented perpendicular to streamlines of fluid flow.

13. The airfoil of claim 12, wherein one side of each triangular recess is open to the pressure surface.

14. The airfoil of claim 12, wherein the tip shelf extends along more than 50% of a chord line of the airfoil.

15. The airfoil of claim 12, wherein the triangular recesses are located between the mean camber line and the pressure surface.

16. The airfoil of claim 12, further comprising:
  at least one cooling hole or cooling slot located in each triangular recess.

\* \* \* \* \*